Patented Dec. 15, 1931

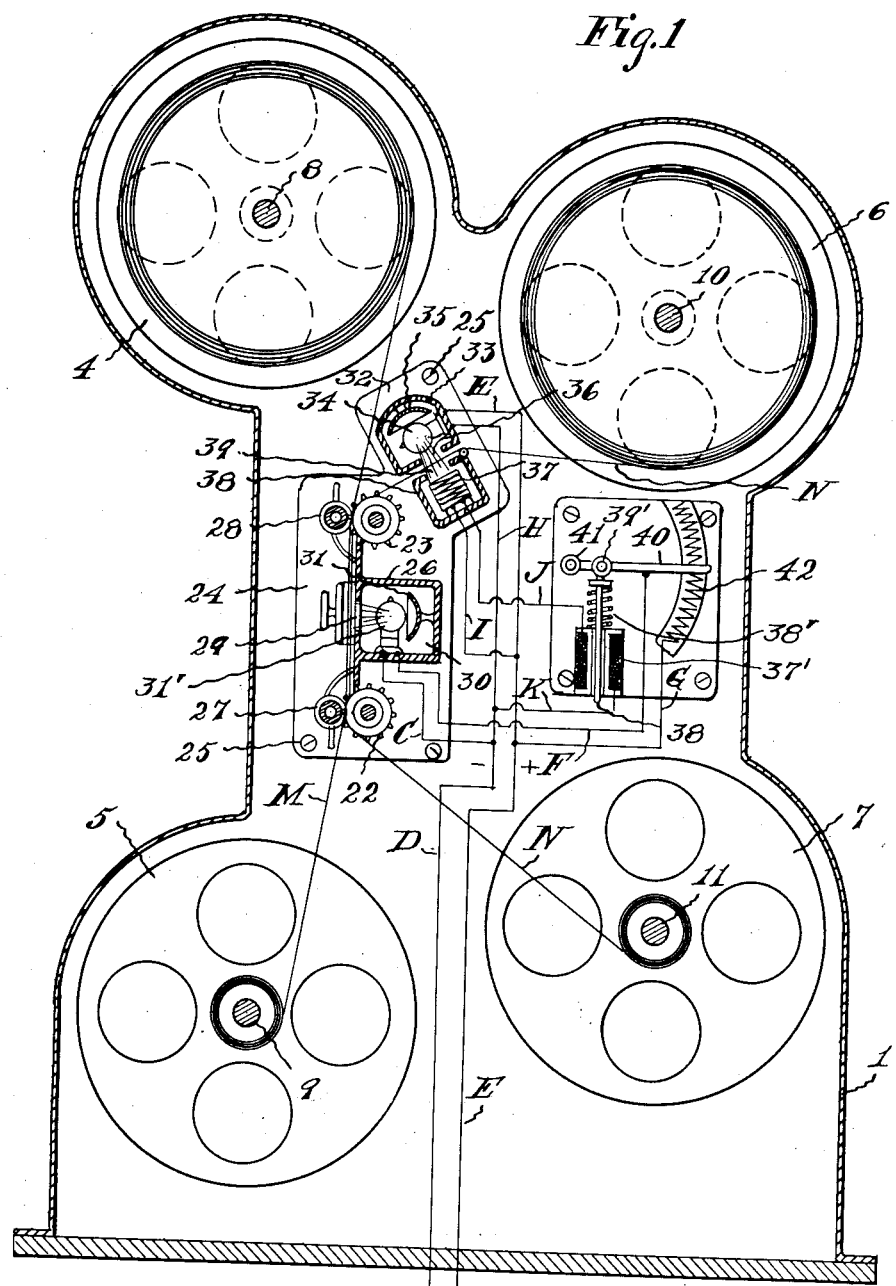

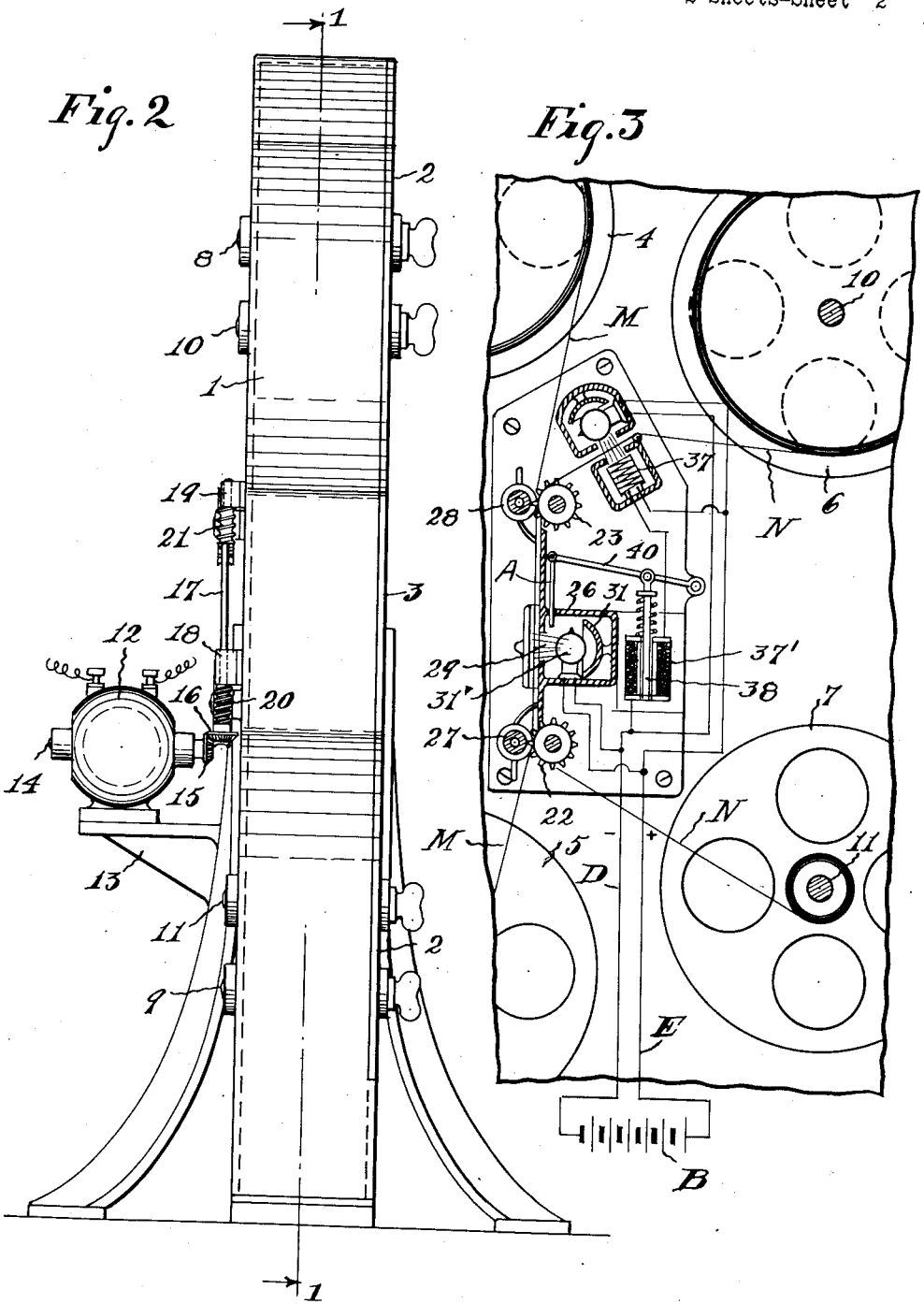

1,836,607

UNITED STATES PATENT OFFICE

JOSEPH R. MALCOLM AND JOHN L. SPENCE, JR., OF NEW YORK, N. Y.; SAID SPENCE ASSIGNOR TO SAID MALCOLM

APPARATUS FOR FILM PRINTERS

Application filed May 17, 1927. Serial No. 192,138.

Our present invention relates to an improved apparatus for use in printing photographic positives from negative films.

In its present embodiment, and as herein disclosed one preferred form of its use is in adapting it to printing from a line of continuous negatives, such as a moving picture film, although, obviously its use need not be so limited.

As is well known, in this class of work, a negative (strip,) film varies greatly in its density, successively, throughout its length, so that in printing positives therefrom, the positives themselves vary in like manner to the detriment of good projection thereafter due to these irregularities.

This has been met heretofore, by providing for a viewing apparatus for the negative film whereby a skilled operator may examine such negative film, and by pure skill and judgment, predetermine the later control of the light in the positive printing machine by the printing operator, this being noted by the skilled operator and indicated by cards to accompany the negative film, and by notching the film itself at such points along the film where such light control is generally indicated by the card, and locally indexed on and for the variably dense portions of the film, thereby to permit the printing of a positive therefrom in which the extremes of density are somewhat averaged and the positive thereby improved for projection. This method leaves much to be desired, as perfection of the finished positive is subject to the more or less guess and skill of the viewing operator.

Our invention is devised to embody an apparatus whereby such density variations in negative films are met, and produce positives of a perfection of evenness of density regardless of any density change in the negative film.

The foregoing is, further, accomplished by varying the printing of an even positive from an uneven negative, by using a fixed or predetermined amount of control light, the variations of which, in passing through the uneven negative cause an inverse action of the printing means, thereby to average the density of the printed positive. Inasmuch as this operation is, in substance, purely mechanical aside from the electrical features thereof, it is, therefore, susceptible of producing a constant density of printed product, involving no human skill or guesswork, regardless of general or local density changes on the negative film.

Due to the details of apparatus structures the films, (negative and positive) may be run at much faster rates of speed, in printing, than has heretofore been possible, this feature having a number of obvious possibilities, such as lowered cost of printing, less exposure of film to heat of printing lamp, with consequent reduction of hazards.

In the drawings Fig. 1 is a sectional view of one form of our apparatus taken on line 1—1 Fig. 2 looking in the direction of the arrows; Fig. 2 is a side view thereof, Fig. 3 is a fragmentary view, similar to Fig. 1, showing a modified form of density control of the printing light. Our apparatus comprises a casing 1, generally enclosing the apparatus, and is provided at one side thereof with a plurality of removable doors 2 and 3, all of which permit access to the film reels 4, 5, 6 and 7, for introduction and removal of the filled and empty reels during operation. These reels are mounted in the casing in the customary manner, upon spindle 8, 9, 10 and 11, these mountings, reels and general features thereof being substantially of well known and general use in this art, and, it is though, need not be further described.

The main mechanism herein is driven, in a continuous manner, by means of an electric motor 12, Fig. 2, mounted, preferably upon the outside of the casing 1 being suitably located upon a bracket 13, as shown. The motor shaft 14 mounts a bevel gear 15, which in turn drives a mate gear 16 rigidly affixed to a vertical worm shaft 17 rotatably supported against the casing wall in bearings 18 and 19. The worm shaft mounts, at its opposite ends worms 20 and 21, which in turn engage worm wheels, not shown which are affixed to and drive the film feeding sprockets 22 and 23, which are rotatably mounted at right angles to the worm shaft 17, but within the casing 1, and upon a bearing or assembly plate 24, which is firmly affixed to the inside wall of the casing 1 by means of screws 25.

Mounted upon the bearing plate 24, which is arranged to support most of the mechanism hereinafter to be described, is a film gate, generally by 26, comprising a pair of upper and lower tensioned film idler rolls 27 and 28, which, as in usual practice are arranged to be movable to thread the film through the gate and to guide the film into and out of the printing position adjacent the gate.

For convenience the gate aperture 29 is housed at its rear, as at 30, thereby to enclose the printing light 31' and condensing reflector 31 and the mounts therefor in a light proof manner.

In the present instance, and for clarity only, we have located the negative density sensing mechanism 32, at a distance from its true location, in Figs. 1 and 3, and it comprises in its essence, an enclosed housing 33 containing an electric light 34 of suitable candle power with its reflector-condenser 35 and their respective mountings, the housing having an aperture at 36 to permit the condensed reflected light rays to pass across the film path to a photo-electric cell 37 of known design, this cell having the function of passing electric current therethrough in accordance with the light variations that fall upon it, this cell being housed in a casing 38 which is apertured as at 39 to coordinate with the aperture 36 of the casing 33.

In actual practice the last above described negative sensing mechanism is actually closer to the film gate aperture 29, so as to act with greater rapidity upon the printer mechanism with a minimum of consecutive or successive pictures between the density sensing position 32 and the film printing gate 29, for obvious reasons.

As a means for causing coordination between the sensing and printing mechanisms above described, we have provided an electrically actuated control for the printing light comprising an electro magnet 37', Fig. 1 in the central core of which is mounted a plunger 38 the upper end thereof being provided with an eye bar pivot or yoke 39', the said yoke being pivotally attached to a movable resistance lever 40, one end of which is pivoted as at 41 for permitting the lever to move across an electrical resistance 42. The plunger 38 is held, normally in a downward position in the core of the solenoid by means of a coil spring 38', so that when the device is in normal inoperative position the resistance lever 40 is in the downward extreme end of the resistance 42. The apparatus controlling the printing of the positive film is actuated by a series of electric circuits of which the following is a description.

The printing light 31' is connected to a source of electric current B, by wires C, D, E, G, resistance 42 lever 40 and wire F, and the amount of current passing through 31' is in accord with the position of lever 40 upon the resistance 42. The density of light 34 is connected to the source of electric current B, by means of wires H, D, E and there being no resistance interposed in this circuit, so that the brilliance of this lamp 34 is constant.

The photo-electric cell 37 is interpolated into and controls the flow of current from B to the printing light 31' through wires E, I, J, through solenoid 37, and wires K and D to source B.

In operation an upper reel 4 is loaded with an unexposed positive film M, and positioned as shown, and another reel 6 is loaded with a negative film N, positioned as shown, and both films are threaded down through the film gate 26, and from thence to their respective reels 5 and 7, as shown. Upon starting the drive means 12, the sprockets 22—23 cause both the films to simultaneously feed past the gate 26, and the lights 31' and 34 are lighted. The light 34, being constant passes through the negative film N, and strikes the photo electric cell 37, whereupon the light striking the same, passes a minimum or maximum current to light 31', according to the varying densities of the negative film passing through housing 33, thereby decreasing or increasing the brilliance of the printing light 31'.

Thus, a heavy or dense section of negative film would pass a minimum amount of current through coil 37' thereby permitting spring 38' to pull down plunger 38, cutting down the resistance in the printing light circuit, and increasing the actinic light, through this dense portion of negative film.

Conversely, when a less dense portion or section of negative film passes through housing 33, a greater amount of light passes to photo-cell 37, passes a great amount of current through coil 37', which in turn throws the plunger 38 upward, thereby increasing resistance in the printing light circuit and causing printing light 31' to receive less current and, therefore, to give out less actinic light, thereby printing the positive lighter.

Thus it will be observed that a dense portion of the negative increases, and a lighter, or less dense portion decreases the actinic light supplied at the printing point to the positive film, and that the accompanying increase or decrease of actinic power to the positive film is automatically controlled by the varying densities of the negative film itself to average the tone, exposure, and density of the positive film.

By this means, and under proper printing light conditions, any negative film of extremes in density is utilized to produce a positive of even density, and at a more rapid rate of speed than has heretofore been possible by hand methods.

In Fig. 3 there is shown a modified form of printing light control, wherein, instead of utilizing a means for controlling the amount of current to the printing light 31', a mask is substituted therefore, and the solenoid means 37' and the plunger 38, are utilized to cause lever 40 therein, reversed as to position, to operate to open or close a mask A between the light 31' and the film gate aperture thereby controlling the amount of actinic light reaching the films M, N, from the light 31', which in the present instance does not, of itself vary in brilliancy during operation.

In this last modification the parts that function as described for those in Figs. 1 and 2 are indicated by similar reference numerals.

Obvious modifications may be made in our device without departing from the spirit of the invention or the claims herewith appended.

Having thus described our invention, what we claim is:

1. In combination, means for feeding superposed film past a printing light; a photoelectric cell adapted to receive transmitted light, from the film to be printed from, in advance of the printing; a fixed solenoid and a source of current connected in series with said cell; a plunger core slidable into said solenoid and having a collar fast on its outer end portion; a spring compressed between said collar and solenoid; a lever fulcrumed at one end and intermediately pivoted to said core; and means operatively engaged by the free end of said lever for varying the action of the printing light.

2. In combination, a film gate having a light aperture at one face; means for continuously feeding developed and unexposed film in superposed position through the film gate with the developed film adjacent to the light aperture; a printing lamp opposite to the aperture; a housing enclosing said lamp and aperture; a sensing lamp housing having an aperture adjacent to the developed film; a sensing lamp therein; a cell casing having an aperture adjacent to the film and registering with the aperture of the sensing lamp housing on the opposite side of the film; a photo electric cell in said casing adapted to receive thereon rays from the sensing lamp passing through the adjacent apertures and film; a fixed solenoid and a source of current connected in series with said cell; a plunger core slidable into said solenoid and having a collar fast on its outer end portion; a spring compressed between said collar and solenoid; a lever fulcrumed at one end and intermediately pivoted to said core; and means operatively engaged by the free end of said lever for varying the action of the light of the printing lamp substantially evenly all the way across the film transverse to the path of the film.

3. In combination, a film gate having a light aperture at one face; pairs of supply and take up reels at the receiving and discharge sides of the gate respectively; means for guiding a developed and unexposed film from the supply reels and feeding them in superposed position through the film gate to the take up reels, with the developed film adjacent to the light aperture; a printing lamp opposite to the aperture; a housing enclosing said lamp and aperture; a sensing lamp housing having an aperture adjacent to the developed film; a sensing lamp therein; a cell casing having an aperture adjacent to the film and registering with the aperture of the sensing lamp housing on the opposite side of the film; a photo electric cell in said casing adapted to receive thereon rays from the sensing lamp passing through the adjacent apertures and film; a fixed solenoid and a source of current connected in series with said cell; a plunger core slidable into said solenoid and having a collar fast on its outer end portion; a spring compressed between said collar and solenoid; a lever fulcrumed at one end and intermediately pivoted to said core; and means operatively engaged by the free end of said lever for varying the action of the light of the printing lamp.

4. In combination, means for feeding superposed film past a printing light; a photoelectric cell adapted to receive transmitted light from the film to be printed from in advance of the printing; a fixed solenoid and a source of current connected in series with said cell; a plunger core slidable in said solenoid; resilient means between said plunger and said solenoid; a lever fulcrumed at one end and intermediately pivoted to said core; and means operatively engaged by the free end of said lever for varying the action of the printing light.

Signed at New York in the county of New York and State of New York this 2nd day of May A. D. 1927.

JOSEPH R. MALCOLM.
JOHN L. SPENCE, Jr.